US011728846B1

United States Patent
Carnevali et al.

(10) Patent No.: US 11,728,846 B1
(45) Date of Patent: Aug. 15, 2023

(54) REMOTE REPEATER DEVICE FOR MOBILE DEVICE DOCK AND METHODS OF MAKING AND USING

(71) Applicant: National Products, Inc., Seattle, WA (US)

(72) Inventors: Jeffrey D. Carnevali, Seattle, WA (US); Scott Anderson, Seattle, WA (US); Stefan Michael Gottschalk, Seattle, WA (US)

(73) Assignee: National Products, Inc., Seattle, WA (US)

( * ) Notice: Subject to any disclaimer, the term of this patent is extended or adjusted under 35 U.S.C. 154(b) by 0 days.

(21) Appl. No.: 17/984,161

(22) Filed: Nov. 9, 2022

Related U.S. Application Data

(63) Continuation of application No. 17/965,372, filed on Oct. 13, 2022.

(51) Int. Cl.
*H04B 5/00* (2006.01)
*H02J 50/10* (2016.01)
(Continued)

(52) U.S. Cl.
CPC ......... *H04B 5/0031* (2013.01); *H04B 1/3888* (2013.01); *H04W 88/04* (2013.01)

(58) Field of Classification Search
None
See application file for complete search history.

(56) References Cited

U.S. PATENT DOCUMENTS

| 809,977 A | 1/1906 | O'Brien |
| 1,786,459 A | 7/1926 | Simons |

(Continued)

FOREIGN PATENT DOCUMENTS

| CN | 1312603 | 9/2001 |
| CN | 101674096 | 3/2010 |

(Continued)

OTHER PUBLICATIONS

Otterbox Product directory, 20 pages of product description of Otter Box waterproof boxes retrieved from web site at www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Tuan A Tran
(74) *Attorney, Agent, or Firm* — Branch Partners PLLC; Bruce E. Black

(57) ABSTRACT

A mobile device dock arrangement includes a mobile device dock and a near field communication (NFC) device. The NFC device includes a first NFC antenna for obtaining data from a readable object when the NFC device is operatively coupled to the NFC reader, where the first NFC antenna permits positioning the first NFC antenna remote from the mobile device dock and the mobile device for obtaining the data from the readable object at a position remote from the mobile device dock and the mobile device; a second NFC antenna coupleable to the mobile device dock and configured, when coupled to the mobile device dock, for presenting the data in readable form to the NFC reader of the mobile device; and a cord coupled, or coupleable, to the first NFC antenna and the second NFC antenna for carrying the data from the first NFC antenna to the second NFC antenna.

20 Claims, 2 Drawing Sheets

(51) Int. Cl.
*G06K 7/00* (2006.01)
*G06K 7/10* (2006.01)
*G06K 19/077* (2006.01)
*H04B 1/3888* (2015.01)
*H04W 88/04* (2009.01)

(56) References Cited

U.S. PATENT DOCUMENTS

| | | | |
|---|---|---|---|
| 2,495,552 A | 1/1950 | Schmitz |
| 2,549,917 A | 4/1951 | Millbrandt |
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |
| 3,464,579 A | 9/1969 | Asenbauer |
| 3,667,648 A | 6/1972 | Koziol |
| 3,885,701 A | 5/1975 | Becklin |
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 7/1986 | Hancock |
| 4,828,558 A | 5/1989 | Kelman |
| 4,842,174 A | 6/1989 | Sheppard et al. |
| 4,848,319 A | 7/1989 | Appeldorn |
| 5,002,184 A | 3/1991 | Lloyd |
| 5,096,317 A | 3/1992 | Phillippe |
| 5,135,189 A | 8/1992 | Ghazizadeh |
| 5,246,133 A | 9/1993 | James |
| 5,272,771 A | 12/1993 | Ansell et al. |
| 5,295,602 A | 3/1994 | Swanson |
| 5,353,934 A | 10/1994 | Yamauchi |
| 5,535,274 A | 7/1996 | Braitberg et al. |
| 5,584,054 A | 12/1996 | Tyneski et al. |
| 5,586,002 A | 12/1996 | Notarianni |
| 5,641,065 A | 6/1997 | Owens et al. |
| 5,646,649 A | 7/1997 | Iwata et al. |
| 5,791,506 A | 8/1998 | Sheffler et al. |
| 5,813,096 A | 9/1998 | Soennichsen |
| 5,822,427 A | 10/1998 | Braitberg et al. |
| 5,842,670 A | 12/1998 | Nigoghosian |
| 5,845,885 A | 12/1998 | Carnevali |
| 5,860,550 A | 1/1999 | Miller et al. |
| 5,895,018 A | 4/1999 | Rielo |
| 5,917,697 A | 6/1999 | Wang |
| 5,953,795 A | 9/1999 | Bauer |
| 5,969,057 A | 10/1999 | Schoeley et al. |
| 5,990,874 A | 11/1999 | Tsumura et al. |
| 5,992,807 A | 11/1999 | Tarulli |
| 6,009,601 A | 1/2000 | Kaufman |
| 6,010,005 A | 1/2000 | Reames et al. |
| 6,032,910 A | 3/2000 | Richter |
| 6,034,505 A | 3/2000 | Arthur et al. |
| 6,035,800 A | 3/2000 | Clifford |
| 6,043,626 A | 3/2000 | Snyder et al. |
| 6,068,119 A | 5/2000 | Derr et al. |
| 6,149,116 A | 11/2000 | Won |
| 6,229,893 B1 | 5/2001 | Chen |
| 6,273,773 B1 | 8/2001 | Bourke |
| 6,276,552 B1 | 8/2001 | Vervisch |
| 6,295,198 B1 | 9/2001 | Loh et al. |
| 6,341,218 B1 | 1/2002 | Poplawsky et al. |
| 6,356,053 B1 | 3/2002 | Sandoz et al. |
| 6,377,825 B1 | 4/2002 | Kennedy et al. |
| 6,406,758 B1 | 6/2002 | Bottari et al. |
| 6,407,860 B1 | 6/2002 | Funazaki et al. |
| 6,561,476 B2 | 5/2003 | Carnevali |
| 6,572,176 B2 | 6/2003 | Davies et al. |
| 6,585,212 B2 | 7/2003 | Carnevali |
| 6,588,637 B2 | 7/2003 | Gates et al. |
| 6,597,924 B1 | 7/2003 | Smith |
| 6,614,423 B1 | 9/2003 | Wong et al. |
| 6,646,864 B2 | 11/2003 | Richardson |
| 6,648,376 B2 | 11/2003 | Christianson |
| 6,687,516 B2 | 2/2004 | Chen |
| 6,702,604 B1 | 3/2004 | Moscovitch |
| 6,754,343 B2 | 6/2004 | Lundstrom et al. |
| 6,762,585 B2 | 7/2004 | Liao |
| 6,776,422 B1 | 8/2004 | Toy |
| 6,785,566 B1 | 8/2004 | Irizarry |
| 6,785,567 B2 | 8/2004 | Kato |
| 6,816,713 B2 | 11/2004 | Chen |
| 6,842,171 B2 | 1/2005 | Richter et al. |
| 6,953,126 B2 | 10/2005 | Parker et al. |
| 6,984,680 B2 | 1/2006 | Quinn |
| 6,995,976 B2 | 2/2006 | Richardson |
| 7,017,243 B2 | 3/2006 | Carnevali |
| 7,031,148 B1 | 4/2006 | Lin |
| 7,068,783 B2 | 6/2006 | Peiker |
| 7,158,376 B2 | 1/2007 | Richardson et al. |
| 7,180,735 B2 | 2/2007 | Thomas et al. |
| 7,230,823 B2 | 6/2007 | Richardson et al. |
| 7,248,901 B2 | 7/2007 | Peiker |
| 7,257,429 B2 | 8/2007 | Kogan |
| 7,283,849 B2 | 10/2007 | Peiker |
| 7,311,526 B2 | 12/2007 | Rohrbach et al. |
| 7,312,984 B2 | 12/2007 | Richardson et al. |
| 7,320,450 B2 | 1/2008 | Carnevali |
| 7,351,066 B2 | 4/2008 | DiFonzo et al. |
| 7,464,814 B2 | 12/2008 | Carnevali |
| 7,480,138 B2 | 1/2009 | Kogan et al. |
| 7,481,664 B1 | 1/2009 | Knoll et al. |
| 7,517,222 B2 | 4/2009 | Rohrbach et al. |
| 7,520,389 B2 | 4/2009 | Lalouette |
| 7,551,458 B2 | 6/2009 | Carnevali |
| 7,566,224 B2 | 7/2009 | Wu |
| 7,594,576 B2 | 9/2009 | Chen et al. |
| 7,609,512 B2 | 10/2009 | Richardson et al. |
| 7,612,997 B1 | 11/2009 | Diebel et al. |
| 7,641,477 B2 | 1/2010 | DiFonzo et al. |
| 7,645,143 B2 | 1/2010 | Rohrbach et al. |
| 7,663,879 B2 | 2/2010 | Richardson et al. |
| 7,688,580 B2 | 3/2010 | Richardson et al. |
| 7,812,567 B2 | 10/2010 | Shen |
| 7,841,776 B2 | 11/2010 | DiFonzo et al. |
| 7,850,032 B2 | 12/2010 | Carnevali et al. |
| 7,855,529 B2 | 12/2010 | Liu |
| RE42,060 E | 1/2011 | Carnevali |
| 7,889,489 B2 | 2/2011 | Richardson et al. |
| 7,901,216 B2 | 3/2011 | Rohrbach et al. |
| 7,907,394 B2 | 3/2011 | Richardson et al. |
| RE42,581 E | 8/2011 | Carnevali |
| 7,997,554 B2 | 8/2011 | Carnevali |
| 8,061,516 B2 | 11/2011 | Carnevali |
| 8,074,951 B2 | 12/2011 | Carnevali |
| 8,087,939 B2 | 1/2012 | Rohrbach et al. |
| 8,099,138 B2 | 1/2012 | Piekarz |
| 8,172,580 B1 | 5/2012 | Chen et al. |
| 8,177,560 B2 | 5/2012 | Rohrbach et al. |
| 8,183,825 B2 | 5/2012 | Sa |
| 8,224,408 B2 | 7/2012 | Tomasini et al. |
| RE43,806 E | 11/2012 | Carnevali |
| 8,390,255 B1 | 3/2013 | Fathollahi |
| 8,405,974 B2 | 3/2013 | Sayavong |
| 8,414,312 B2 | 4/2013 | Hung et al. |
| 8,435,042 B2 | 5/2013 | Rohrbach et al. |
| 8,453,835 B2 | 6/2013 | So |
| 8,454,178 B2 | 6/2013 | Carnevali |
| 8,483,758 B2 | 7/2013 | Huang |
| 8,497,753 B2 | 7/2013 | DiFonzo et al. |
| 8,505,861 B2 | 8/2013 | Carnevali |
| 8,560,014 B1 | 10/2013 | Hu et al. |
| 8,634,887 B2 | 1/2014 | Hu et al. |
| 8,639,288 B1 | 1/2014 | Friedman |
| 8,646,698 B2 | 2/2014 | Chen et al. |
| 8,690,582 B2 | 4/2014 | Rohrbach et al. |
| 8,729,854 B2 | 5/2014 | Tsai et al. |
| 8,760,311 B2 | 6/2014 | Heaton |
| 8,763,802 B2 | 7/2014 | Ellis-Brown |
| 8,792,859 B2 * | 7/2014 | Ohira ............ G08C 17/02 455/410 |
| 8,801,441 B2 | 8/2014 | Zhang et al. |

(56) References Cited

U.S. PATENT DOCUMENTS

| | | |
|---|---|---|
| 8,825,123 B1 | 9/2014 | Gudino |
| 8,891,800 B1 | 11/2014 | Shaffer |
| 8,907,783 B2 | 12/2014 | Fish et al. |
| 8,911,246 B2 | 12/2014 | Carnevali |
| 8,929,065 B2 | 1/2015 | Williams |
| 8,950,717 B2 | 2/2015 | Chuang |
| 8,954,117 B2 * | 2/2015 | Huang .................. A45C 15/00 455/575.8 |
| 8,970,332 B2 | 3/2015 | DiFonzo et al. |
| 8,995,957 B2 * | 3/2015 | Ohira ..................... G08C 17/02 455/410 |
| 9,026,187 B2 * | 5/2015 | Huang .................. H04B 1/3888 455/575.8 |
| 9,048,665 B2 * | 6/2015 | Wojcik ................. G01R 31/382 |
| 9,071,060 B2 | 6/2015 | Fathollahi |
| 9,072,172 B2 | 6/2015 | Hsu |
| 9,112,304 B2 | 8/2015 | Rohrbach et al. |
| 9,123,935 B2 | 9/2015 | Huang |
| 9,172,781 B1 | 10/2015 | Goldstein |
| 9,197,312 B2 * | 11/2015 | Wendling ........... H04N 21/4221 |
| 9,231,410 B2 * | 1/2016 | Wojcik .................. H02J 7/0042 |
| 9,313,733 B2 * | 4/2016 | Moshfeghi ........ H04W 52/0206 |
| 9,344,154 B2 * | 5/2016 | Wendling ........... H04N 21/2223 |
| 9,356,267 B1 | 5/2016 | To et al. |
| 9,647,474 B2 | 5/2017 | Fathollahi et al. |
| 9,774,192 B2 * | 9/2017 | Wojcik .................... G06F 21/86 |
| 9,831,904 B1 | 11/2017 | Carnevali |
| 10,304,043 B1 * | 5/2019 | Nguyen ............... G06Q 20/208 |
| 10,410,021 B1 * | 9/2019 | Razaghi ............. G06Q 20/3278 |
| 10,609,643 B1 * | 3/2020 | Le ........................ H04B 5/0031 |
| 10,832,019 B2 * | 11/2020 | Tsai .................... G06K 7/10128 |
| 11,029,731 B1 | 6/2021 | Carnevali |
| 11,076,032 B1 | 7/2021 | Carnevali |
| 11,100,298 B1 * | 8/2021 | Razaghi ................. G06K 7/083 |
| 11,176,334 B1 * | 11/2021 | Kushner ............... G07F 7/0893 |
| 11,277,506 B2 | 3/2022 | Carnevali |
| 11,336,332 B2 * | 5/2022 | Spick ................. G06K 7/10178 |
| 2004/0108348 A1 | 6/2004 | Barnes |
| 2005/0189354 A1 | 9/2005 | Heather et al. |
| 2006/0058073 A1 | 3/2006 | Kim |
| 2006/0175766 A1 | 8/2006 | Carnevali |
| 2009/0160400 A1 | 6/2009 | Woud |
| 2009/0314400 A1 | 12/2009 | Liu |
| 2012/0018325 A1 | 1/2012 | Kim |
| 2012/0043235 A1 | 2/2012 | Klement |
| 2012/0118773 A1 | 5/2012 | Rayner |
| 2012/0211382 A1 | 8/2012 | Rayner |
| 2012/0250270 A1 | 10/2012 | Liu |
| 2012/0261306 A1 | 10/2012 | Richardson et al. |
| 2012/0298536 A1 | 11/2012 | Rauta et al. |
| 2013/0092576 A1 | 4/2013 | Rayner |
| 2013/0106353 A1 | 5/2013 | Foster |
| 2013/0193006 A1 | 8/2013 | Bergreen et al. |
| 2013/0220841 A1 | 8/2013 | Yang |
| 2013/0258573 A1 | 10/2013 | Muday et al. |
| 2013/0273752 A1 | 10/2013 | Rudisill et al. |
| 2013/0273983 A1 | 10/2013 | Hsu |
| 2013/0331156 A1 | 12/2013 | Lui |
| 2013/0334071 A1 | 12/2013 | Carnevali |
| 2014/0168885 A1 | 6/2014 | Williams |
| 2014/0178222 A1 | 6/2014 | Hou et al. |
| 2015/0146401 A1 | 5/2015 | Su et al. |
| 2015/0189780 A1 | 7/2015 | Su et al. |
| 2015/0270861 A1 | 9/2015 | Lin et al. |
| 2015/0358439 A1 | 12/2015 | Carnevali |
| 2016/0065702 A1 | 3/2016 | Carnevali |
| 2016/0372858 A1 | 12/2016 | Huo et al. |
| 2017/0227987 A1 | 8/2017 | Carnevali et al. |
| 2020/0192441 A1 | 6/2020 | Saravis |
| 2021/0194256 A1 | 6/2021 | Carnevali |
| 2021/0391678 A1 | 12/2021 | Carnevali |
| 2022/0253097 A1 | 8/2022 | Carnevali et al. |
| 2022/0300721 A1 * | 9/2022 | Harney .............. G06K 7/10009 |
| 2022/0352682 A1 | 11/2022 | Carnevali |

FOREIGN PATENT DOCUMENTS

| | | |
|---|---|---|
| CN | 202268924 | 6/2012 |
| CN | 202565335 | 11/2012 |
| CN | 203135945 | 8/2013 |
| CN | 204408423 | 6/2015 |
| JP | 2004-349969 | 12/2004 |
| JP | 2014-75327 | 4/2014 |
| KR | 20-0265673 | 2/2002 |
| KR | 20070031130 | 3/2007 |
| KR | 10-1078214 | 11/2011 |
| TW | 2003TW531119 | 5/2003 |
| TW | M376983 | 3/2010 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Officeonthego.com, 3 pages of product description of Magnifico ® PLUS screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

U.S. Appl. No. 17/397,258, filed Aug. 9, 2021.

* cited by examiner

REMOTE REPEATER DEVICE FOR MOBILE DEVICE DOCK AND METHODS OF MAKING AND USING

CROSS-REFERENCE TO RELATED APPLICATIONS

This patent application is a continuation of U.S. patent application Ser. No. 17/965,372, filed Oct. 13, 2022, which is incorporated herein by reference.

FIELD

The present invention is directed to remote repeater device for a mobile device dock. The present invention is also directed to cases for a mobile device dock that includes a remote repeater device and methods of making and using.

BACKGROUND

Mobile devices, such as smartphones, cellular or mobile phones, tablets, personal data assistants, and other portable devices, are now ubiquitous. A mobile device can include a reader, such as a NFC (near field communications) reader, for reading tags or other readable objects on or in a product or other item. In at least some circumstances, access to the reader of the mobile device may be limited or inconvenient. For example, a mobile device may be mounted in a vehicle and the reader may be difficult or inconvenient to access because of the mounting position.

BRIEF SUMMARY

One embodiment is a mobile device dock arrangement that includes a mobile device dock configured for coupling to a mobile device with a NFC reader and a near field communication (NFC) device. The NFC device includes a first NFC antenna configured for obtaining data from the readable object when the NFC device is operatively coupled to the NFC reader, wherein the first NFC antenna is configured to permit positioning the first NFC antenna remote from the mobile device dock and the mobile device for obtaining the data from the readable object at a position remote from the mobile device dock and the mobile device; a second NFC antenna coupleable to the mobile device dock and configured, when coupled to the mobile device dock, for presenting the data in readable form to the NFC reader of the mobile device coupled to the mobile device dock; and a cord coupled, or coupleable, to the first NFC antenna and the second NFC antenna and configured for carrying the data from the first NFC antenna to the second NFC antenna.

In at least some embodiments, the mobile device dock arrangement further includes a mount simultaneously coupleable to the mobile device dock and the first NFC antenna. In at least some embodiments, the first NFC antenna includes a first housing and the first housing includes holes configured for attachment of the mount to the first NFC antenna.

In at least some embodiments, the mobile device dock arrangement further includes the mobile device. In at least some embodiments, the mobile device includes the NFC reader. In at least some embodiments, the mobile device dock arrangement further includes the NFC reader as an accessory coupled, or coupleable, to the mobile device.

In at least some embodiments, the second NFC antenna includes a second housing and the second housing includes holes configured for mounting of the second NFC antenna to the mobile device dock. In at least some embodiments, the second NFC antenna is mounted on the mobile device dock.

In at least some embodiments, the mobile device dock includes the second NFC antenna as a permanent part of the mobile device dock. In at least some embodiments, the cord is hardwired to the first NFC antenna. In at least some embodiments, the cord is hardwired to the second NFC antenna. In at least some embodiments, the cord includes a first connector and the first NFC antenna includes a second connector configured to removably couple to the first connector. In at least some embodiments, the cord includes a third connector and the second NFC antenna includes a fourth connector configured to removably couple to the third connector.

Another embodiment is a near field communication (NFC) repeater device configured for coupling to a mobile device dock for a mobile device with an NFC reader. The NFC repeater device includes a first NFC antenna configured for obtaining data from a readable object when the NFC device is operatively coupled to the NFC reader, wherein the first NFC antenna is configured to permit positioning the first NFC antenna remote from the mobile device dock and the mobile device for obtaining the data from the readable object at a position remote from the mobile device dock and the mobile device; a second NFC antenna coupleable to the mobile device dock and configured, when coupled to the mobile device dock, for presenting the data in readable form to the NFC reader of the mobile device; and a cord coupled, or coupleable, to the first NFC antenna and the second NFC antenna and configured for carrying the data from the first NFC antenna to the second NFC antenna.

In at least some embodiments, the cord is hardwired to the first NFC antenna. In at least some embodiments, the cord is hardwired to the second NFC antenna. In at least some embodiments, the cord includes a first connector and the first NFC antenna includes a second connector configured to removably couple to the first connector. In at least some embodiments, the cord includes a third connector and the second NFC antenna includes a fourth connector configured to removably couple to the third connector.

In at least some embodiments, the first NFC antenna includes a first housing and the first housing includes holes configured for attachment of a mount to the first NFC antenna. In at least some embodiments, the second NFC antenna includes a second housing and the repeater housing includes holes configured for mounting of the second NFC antenna to a mobile device dock.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to remote repeater device for a mobile device dock. The present invention is also directed to cases for a mobile device dock that includes a remote repeater device and methods of making and using.

Mobile devices are used in a variety of contexts for interactions with multiple users. For example, a mobile device can be used in a delivery vehicle for managing the deliveries. Similarly, mobile devices can be used as point-of-sale devices to complete transactions with a customer. The mobile device can include a reader, such as a NFC (near field communications) reader, for reading tags on or in a product or other item. In at least some circumstances, it may be difficult or inconvenient to access the mobile device for reading a tag or other readable object. A device remote from the mobile device which can assist in reading NFC tags or other readable objects can be provide more flexibility in reading the NFC tags or other readable objects.

Figure 1A:
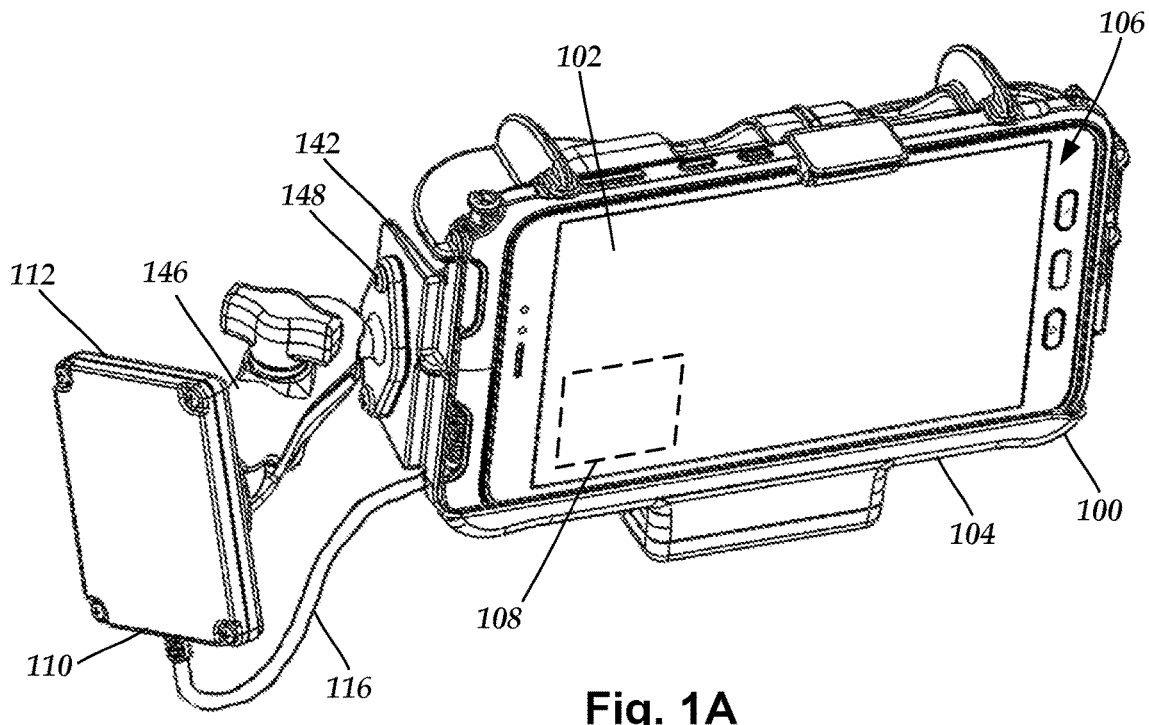
FIG. 1A is a schematic perspective front view of one embodiment of mobile device dock arrangement with a mobile device dock, a NFC device with two NFC antennas, and a mobile device, according to the invention.
Figure 1B:
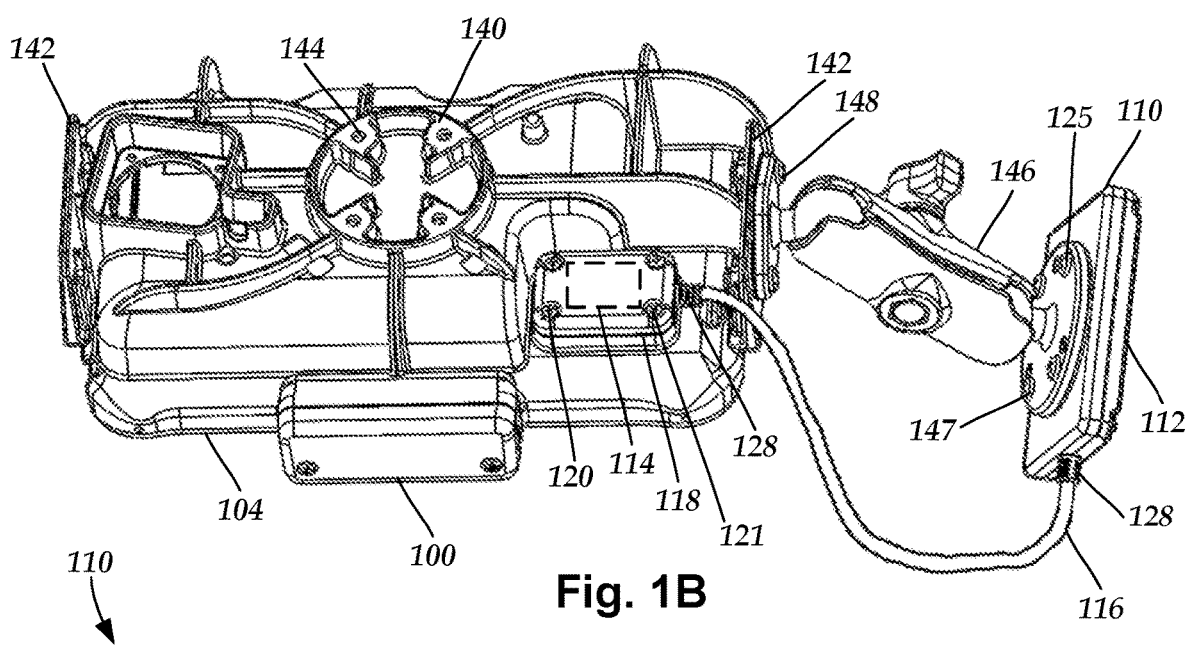
FIG. 1B is a schematic perspective back view of the mobile device dock arrangement of FIG. 1A, according to the invention.

FIGS. 1A and 1B illustrate one embodiment of a mobile device dock 100 for a mobile device 102, such as a cellular or mobile phone, a smartphone, a tablet, a personal data assistant, a laptop (or other computer), or any other suitable mobile device. The mobile device dock 100 includes a shell 104 for the mobile device which defines a cavity 106 to receive the mobile device 102. The shell 104 may completely or partially surround a perimeter of the mobile device 102. Examples of mobile device docks 100 (or accessory attachments that can be used as a mobile device dock) can be found at U.S. Pat. Nos. 11,029,731; 11,076,032; and 11,277,506; U.S. Patent Application Publications Nos. 2021/0194256 and 2021/0391678; and U.S. patent application Ser. Nos. 17/174,152; 17/246,003; and 17/397,258, all of which are incorporated herein by reference in their entireties.

In at least some embodiments, the mobile device dock 100 includes a back mounting site 140 or one or more side mounting sites 142 or any combination thereof, as illustrated in FIG. 1B. The back mounting site 140 or side mounting site(s) 142 include holes 144 for receiving fasteners 148 for fastening a mount 146, as illustrated in FIGS. 1A and 1B. Any suitable mount 146 can be used. Non-limiting examples of mounts, mounting arrangements, and mounting devices can be found at, for example, U.S. Pat. Nos. 5,845,885; 6,561,476; 7,320,50; 7,997,554; 8,454,178; 8,505,861; 9,831,904; RE42,060; RE42,581; and RE43,806 and U.S. patent application Ser. Nos. 16/298,952 and 17/174,152, all of which are incorporated herein by reference in their entireties.

The mobile device 102 includes a near field communication (NFC) reader 108. For example, many mobile devices 102 used in retail or other commercial settings are equipped with a NFC reader 108. A mobile device 102 can have a NFC reader 108 as a permanent part of the mobile device or as an accessory attached, or otherwise coupled, to the mobile device.

Attached to the mobile device dock 100 (or incorporated as part of the mobile device dock) is a near field communication (NFC) device 110, such as an NFC repeater device, that includes a first NFC antenna 112, a second NFC antenna 114 (FIG. 1B), and a cord 116 connecting the first NFC antenna to the second NFC antenna. The first NFC antenna 112 can be positioned remote from the mobile device dock 100 to facilitate access for reading a NFC tag or other readable object on or within an item.

FIGS. 2A to 2D illustrate one embodiment of the NFC device 110 uncoupled from the mobile device dock 100. The first NFC antenna 112 receive data from a readable object, such as a NFC tag, on a product or other item to obtain data from the readable object. The second NFC antenna 114 receives the data via the cord 116 and presents the data in readable form to the NFC reader 108 of the mobile device 102.

In at least some embodiments, the NFC reader 108 inductively couples to the second NFC antenna 114 to provide power to the first and second NFC antennas 112, 114. This results in the first NFC antenna producing an electromagnetic field for interaction with an NFC tag or other readable object resulting in the first NFC antenna receiving data from the NFC tag or other readable object. In at least some embodiments, the first NFC antenna 112 can be part of a NFC reader that obtains the data and delivers the data to the second NFC antenna 114 for transmission to the NFC reader 108 of the mobile device 102.

In at least some embodiments, the first NFC antenna 112 includes a first antenna arrangement 122 disposed in a first housing 124. In at least some embodiments, the first housing 124 is a two-part shell with fasteners 126. In at least some embodiments, the first housing 124 includes holes 125 for attachment of a mount 146 using fasteners 147, as illustrated in FIG. 1B.

The first NFC antenna 112 can be tethered to the mobile device dock 100 using the cord 116 and the second NFC antenna 114. The first NFC antenna 112 can be positioned remote (for example, a distance of at least 5, 10, or more centimeters away) from the mobile device dock. For example, remote positioning may facilitate capture of data from a NFC tag or other readable object that may be difficult or inconvenient to capture using the mobile device 102 in the mobile device dock 100. In at least some embodiments, the first NFC antenna 112 can be attached to a mount 146 that is attached to the mobile device dock 100, as illustrated in FIGS. 1A and 1B. In other embodiments, the first NFC antenna 112 is attached to a mount 146 that is attached to another surface, device, or the like. In yet other embodiments, the first NFC antenna 112 is not attached to a mount and is movable from position to position without detachment from a mount, surface, or other device.

In at least some embodiments, the second NFC antenna 114 is disposed in a second housing 118 that can be attached to the mobile device dock 100 using fasteners 120 through holes 121 in the second housing, as illustrated in FIG. 1B. In at least some other embodiments, the second NFC antenna 114 is a permanent or integrated part of the mobile device dock 100 instead of an arrangement that can be readily coupled to, or uncoupled from, the mobile device dock.

The cord 116 includes conductors, such as wires or traces, that carry the data from the first NFC antenna 112 to the second NFC antenna 114. The cord 116 extends from the first NFC antenna 112 to the second NFC antenna 114 and preferably includes one or more strain relief elements 128 where the cord exits the first NFC antenna or the second NFC antenna or their respective housings 124, 118. Any suitable strain relief element 128 can be used including, for example, the baffle-type strain relief in the illustrated embodiment. The cord 116 includes a jacket encasing wires or traces that extend along the cord 116.

Figure 3:
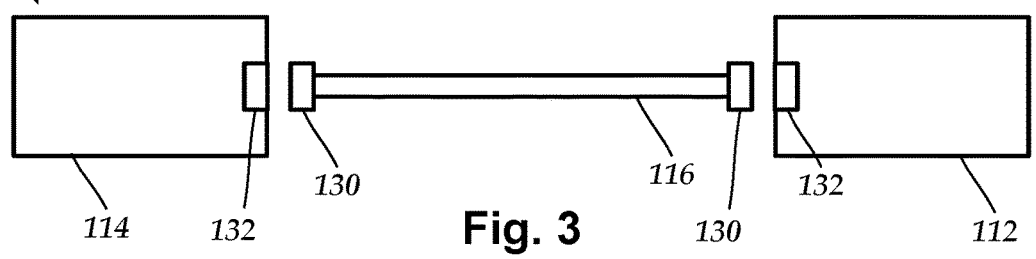
FIG. 3 is a schematic top view of another embodiment of a NFC device with connectors on the first NFC antenna, cord, and second NFC antenna, according to the invention.
Figure 2A:
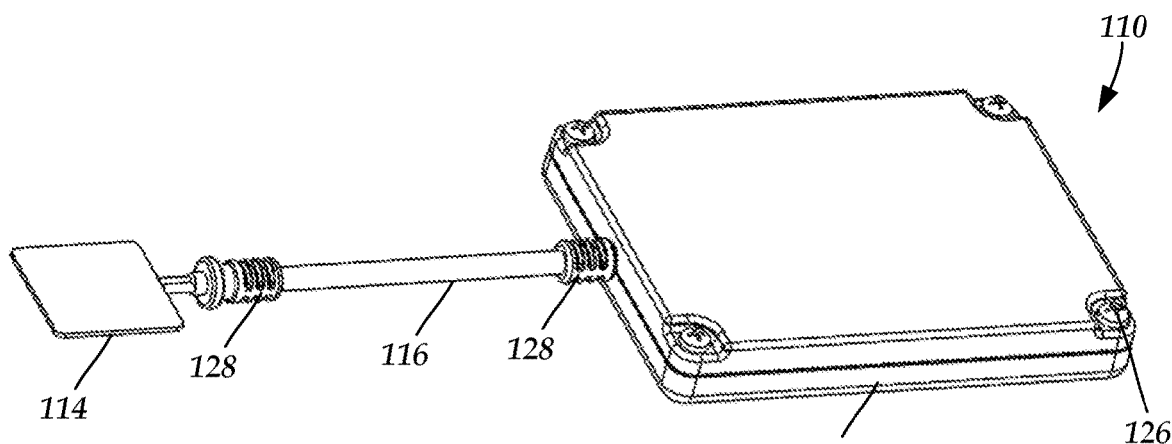
FIG. 2A is a schematic perspective top view of one embodiment of a NFC device with two NFC antennas, according to the invention.
Figure 2B:
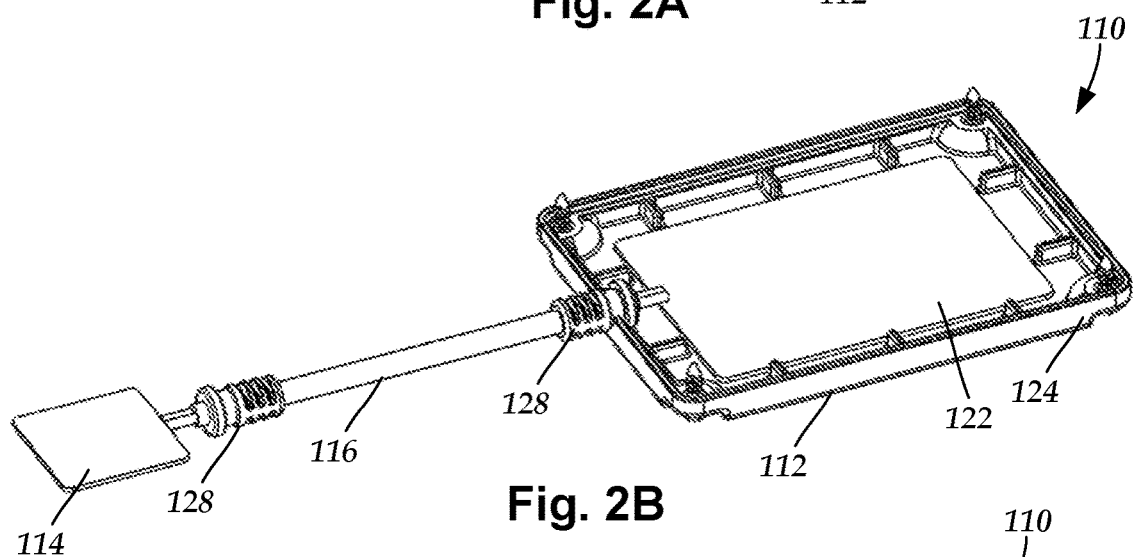
FIG. 2B is a schematic perspective top view of the NFC device of FIG. 2A with a portion of the housing of the first NFC antenna removed, according to the invention.
Figure 2C:
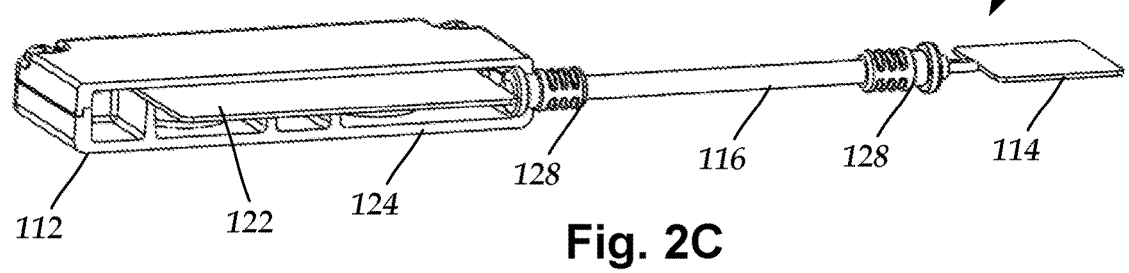
FIG. 2C is a schematic perspective partial cross-sectional view of the NFC device of FIG. 2A, according to the invention.
Figure 2D:
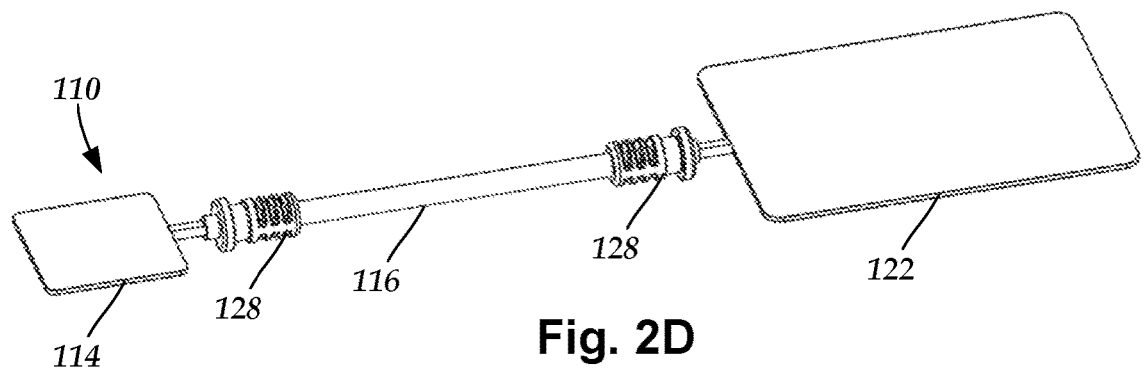
FIG. 2D is a schematic perspective top view of the NFC device of FIG. 2A with the housing of the first NFC antenna removed, according to the invention.

In at least some embodiments, the cord 116 is hardwired to the antenna arrangement 122 of the first NFC antenna 112 or to the second NFC antenna 114 or to both, as illustrated in FIGS. 2A to 2D. In at least some embodiments, as illustrated in FIG. 3, one or both of the ends of the cord 116 have a connector 130 such as, for example, any type of USB connector (for example, any type of USB-A, USB-B, USB-C, Micro-USB, or Mini-USB connector), Lightning connector, prong connector, audio- or video-type connector, connector for a vehicle cigarette lighter, or the like. The cord 116 can then connect to a corresponding connector 132 of the first NFC antenna 112 or the second NFC antenna 114 or both.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A mobile device dock arrangement, comprising:
    a mobile device dock configured for coupling to a mobile device with a NFC reader;
    a near field communication (NFC) device comprising:
        a first NFC antenna configured for obtaining data from a readable object when the NFC device is operatively coupled to the NFC reader, wherein the first NFC antenna is configured to permit positioning the first NFC antenna remote from the mobile device dock and the mobile device for obtaining the data from the readable object at a position remote from the mobile device dock and the mobile device;
        a second NFC antenna coupleable to the mobile device dock and configured, when coupled to the mobile device dock, for presenting the data in readable form to the NFC reader with the mobile device coupled to the mobile device dock; and
        a cord coupled, or coupleable, to the first NFC antenna and the second NFC antenna and configured for carrying the data from the first NFC antenna to the second NFC antenna; and
    a mount simultaneously coupleable to the mobile device dock and the first NFC antenna.

2. The mobile device dock arrangement of claim 1, further comprising the mobile device.

3. The mobile device dock arrangement of claim 2, wherein the mobile device comprises the NFC reader.

4. The mobile device dock arrangement of claim 2, wherein the mobile device with the NFC reader comprises the NFC reader as an accessory coupled, or coupleable, to the mobile device.

5. The mobile device dock arrangement of claim 1, wherein the mobile device dock comprises the second NFC antenna as a permanent part of the mobile device dock.

6. The mobile device dock arrangement of claim 1, wherein the cord is hardwired to the first NFC antenna.

7. The mobile device dock arrangement of claim 1, wherein the cord is hardwired to the second NFC antenna.

8. The mobile device dock arrangement of claim 1, wherein the cord comprises a first connector and the first NFC antenna comprises a second connector configured to removably couple to the first connector.

9. The mobile device dock arrangement of claim 8, wherein the cord comprises a third connector and the second NFC antenna comprises a fourth connector configured to removably couple to the third connector.

10. A mobile device dock arrangement, comprising:
    a mobile device dock configured for coupling to a mobile device with a NFC reader; and
    a near field communication (NFC) device comprising:
        a first NFC antenna configured for obtaining data from a readable object when the NFC device is operatively coupled to the NFC reader, wherein the first NFC antenna is configured to permit positioning the first NFC antenna remote from the mobile device dock and the mobile device for obtaining the data from the readable object at a position remote from the mobile device dock and the mobile device;
        a second NFC antenna coupleable to the mobile device dock and configured, when coupled to the mobile device dock, for presenting the data in readable form to the NFC reader with the mobile device coupled to the mobile device dock, wherein the second NFC antenna comprises a second housing and the second housing comprises holes configured for mounting of the second NFC antenna to the mobile device dock; and
        a cord coupled, or coupleable, to the first NFC antenna and the second NFC antenna and configured for carrying the data from the first NFC antenna to the second NFC antenna.

11. The mobile device dock arrangement of claim 10, further comprising a mount simultaneously coupleable to the mobile device dock and the first NFC antenna.

12. The mobile device dock arrangement of claim 11, wherein the first NFC antenna comprises a first housing and the first housing comprises holes configured for attachment of the mount to the first NFC antenna.

13. The mobile device dock arrangement of claim 11, wherein the first NFC antenna comprises a first housing and the first housing comprises holes configured for attachment of the mount to the first NFC antenna.

14. The mobile device dock arrangement of claim 10, wherein the second NFC antenna is mounted on the mobile device dock.

15. A near field communication (NFC) repeater device configured for coupling to a mobile device dock for a mobile device with an NFC reader, the NFC repeater device comprising:
    a first NFC antenna configured for obtaining data from a readable object when the NFC repeater device is operatively coupled to the NFC reader, wherein the first NFC antenna is configured to permit positioning the first NFC antenna remote from the mobile device dock and the mobile device for obtaining the data from the readable object at a position remote from the mobile device dock and the mobile device, wherein the first NFC antenna comprises a first housing and the first housing comprises holes configured for attachment of a mount to the first NFC antenna;
    a second NFC antenna coupleable to the mobile device dock and configured, when coupled to the mobile device dock, for presenting the data in readable form to the NFC reader of the mobile device; and a cord coupled, or coupleable, to the first NFC antenna and the second NFC antenna and configured for carrying the data from the first NFC antenna to the second NFC antenna.

16. The NFC repeater device of claim 15, wherein the cord is hardwired to the first NFC antenna.

17. The NFC repeater device of claim 15, wherein the cord is hardwired to the second NFC antenna.

18. The NFC repeater device of claim 15, wherein the cord comprises a first connector and the first NFC antenna comprises a second connector configured to removably couple to the first connector.

19. The NFC repeater device of claim 18, wherein the cord comprises a third connector and the second NFC antenna comprises a fourth connector configured to removably couple to the third connector.

20. The NFC repeater device of claim 15, wherein the second NFC antenna comprises a second housing and the second housing comprises holes configured for mounting of the second NFC antenna to a mobile device dock.

\* \* \* \* \*